United States Patent

Matsumura et al.

[11] Patent Number: 5,949,431
[45] Date of Patent: Sep. 7, 1999

[54] METHOD AND APPARATUS FOR LAYING OUT IMAGE WHILE CUTTING OUT PART OF THE IMAGE

[75] Inventors: Takuro Matsumura; Hiroshi Murayama; Masami Fujibayashi, all of Kyoto, Japan

[73] Assignee: Dainippon Screen Mfg. Co., Ltd., Kyoto, Japan

[21] Appl. No.: 08/752,911

[22] Filed: Nov. 20, 1996

[30] Foreign Application Priority Data

Nov. 24, 1995 [JP] Japan .................................. 7-329766

[51] Int. Cl.$^6$ ...................................................... G06F 15/00
[52] U.S. Cl. ............................................................ 345/435
[58] Field of Search ................................. 345/342, 340, 345/435, 442, 440

[56] References Cited

U.S. PATENT DOCUMENTS

5,664,128  9/1997  Bauer .................................... 345/334

Primary Examiner—Phu K. Nguyen
Attorney, Agent, or Firm—McDermott, Will & Emery

[57] ABSTRACT

An image layout apparatus includes: display unit for displaying a one-page image; parts layout unit for laying out a target image part PP on a one-page image, according to an instruction given by the user; mask creating unit for creating one or a plurality of cutout masks with respect to the target image part PP laid out on the one-page image, according to a specification given by the user; and drawing unit for cutting out the target image part PP with a plurality of cutout masks SM and CM created for the target image part PP and drawing the cut-out target image part on the one-page image.

15 Claims, 10 Drawing Sheets

Fig. 3A   WHOLE IMAGE PART PP

Fig. 3B   ONE-PAGE IMAGE PG

FIRST MASKED IMAGE PART MP1

Fig. 8B

SECOND MASKED IMAGE PART MP2

Fig. 8C

STRUCTURE OF MASKED IMAGE PART DATA

LAYOUT CHARACTER IMAGE PART QQ

Fig. 10B

CHANGE LAYOUT PRIORITY ALLOCATED TO CHARACTER IMAGE PART QQ

Fig. 11A

SECOND MASKED IMAGE PART MP2

IMAGE PART QQ OF CHARACTERS

NICE PITCH    Pr=2

Fig. 11C

FIRST MASKED IMAGE PART MP1

RESULT OF DRAWING

METHOD AND APPARATUS FOR LAYING OUT IMAGE WHILE CUTTING OUT PART OF THE IMAGE

BACKGROUND OF THE INVENTION

1. Field of the Invention

The present invention relates to a method and an apparatus for laying out an image in a one-page image while cutting out a part of the image.

2. Description of the Related Art

An image layout apparatus is generally used to layout a plurality of image parts on a one-page image. Each image part represents an image laid out as one part. The image parts include picture (photograph) image parts expressed by bit map data and linework image parts (such as characters and rules) expressed by run length data.

Each image part may be used wholly in some case and partly in others. When only a portion of an image part is required, a cutout mask is generally used for masking a non-required image area.

In the field of prepress process, it is required to specify a contour of a cutout mask with a high degree of accuracy in order to obtain a highly precise one-page image. In a conventional procedure, cutout masks of the respective image parts are created with a dedicated image cutout device before the image parts are laid out with the image layout apparatus.

It is sometimes required to add or modify the cutout masks according to the layout of the image parts on a one-page image. In such a case, the conventional procedure separately creates additional cutout masks or modifies the existing cutout masks with the dedicated image cutout device and then transfers the cutout masks thus obtained to the image layout apparatus. The addition or modification of cutout masks is rather time and labor consuming. The conventional technique also has a difficulty in creating cutout masks suitable for the layout condition.

SUMMARY OF THE INVENTION

Accordingly, an object of the present invention is to readily create a cutout mask of an image part that is suitable for a layout condition.

The present invention is directed to an apparatus for laying out an image part on a one-page image. The apparatus comprises: display means for displaying the one-page image; parts layout means for laying out a target image part on the one-page image, according to an instruction given by a user; mask creating means for creating a cutout mask for the target image part which has been laid out on the one-page image, according to a specification given by the user; and drawing means for cutting out the target image part with a plurality of cutout masks created for the target image part, and drawing the cut-out target image part on the one-page image.

The mask creating means creates one or a plurality of cutout masks for a target image part laid out on a one-page image. Accordingly, the cutout masks suitable for the laid-out condition are readily created. The drawing means cuts out the target image part with the plurality of cutout masks, which are created for the identical target image part, and draws the cutout target image part on the one-page image. This feature enables desired areas of the target image part to be cut out with the plurality of cutout masks.

In a preferred embodiment, the drawing means comprises: masked parts generating means for generating a plurality of masked image parts by combining the target image part with the plurality of cutout masks; and layout priority setting means for allocating different layout priorities to the plurality of masked image parts, the layout priorities indicating an order of drawing the plurality of masked image parts.

When respective layout priorities are allocated to a plurality of masked image parts generated from the same target image part while an intermediate layout priority is allocated to another image part, the one-page image drawn according to the layout priorities will give visual effects such that the overlaying arrangement of the target image part and another image part is different in some image portions.

In a preferred embodiment, the plurality of cutout masks created for the target image part includes a cutout mask created by the mask creating means and a standard cutout mask having a predetermined shape, such as a rectangle.

The drawing means further comprises: parts linking means for linking the plurality of masked image parts with one another so that the plurality of masked image parts are positioned at interrelated locations on the one-page image. When one of the plural masked image parts that are generated from the same target image changes its position, the other masked image parts also change their positions automatically. This feature can readily adjust the layout of the plurality of masked image parts as if they are one masked image part.

The parts linking means comprises: means for linking the plurality of masked image parts with one another so that the target image part included in each the plurality of masked image parts is positioned at the same location on the one-page image.

The present invention is also directed to a method of laying out an image part on a one-page image. The method comprises the steps of: (a) laying out a target image part on the one-page image, according to an instruction given by a user; (b) creating a cutout mask for the target image part which has been laid out on the one-page image, according to a specification given by the user; (c) cutting out the target image part with a plurality of cutout masks created for the target image part; and (d) drawing the cut-out target image part on the one-page image.

In a preferred embodiment, the step (c) comprises the steps of: (i) generating a plurality of masked image parts by combining the target image part with the plurality of cutout masks; and (ii) allocating different layout priorities to the plurality of masked image parts, the layout priorities indicating an order of drawing the plurality of masked image parts.

The plurality of cutout masks created for the target image part includes a cutout mask created by the mask creating means and a standard cutout mask having a predetermined shape.

The step (c) further comprises the step of: (iii) linking the plurality of masked image parts with one another so that the plurality of masked image parts are positioned at interrelated locations on the one-page image.

The step (iii) comprises the step of: linking the plurality of masked image parts with one another so that the target image part included in each the plurality of masked image parts is positioned at the same location on the one-page image.

The present invention is also directed to a computer readable medium having computer program code means embodied therein for laying out an image part on a one-page image. The computer program code means comprises: computer program code means for causing a computer to lay out a target image part on the one-page image, according to an instruction given by a user; computer program code means for causing the computer to create a cutout mask for the target image part which has been laid out on the one-page image, according to a specification given by the user; and computer program code means for causing the computer to cut out the target image part with a plurality of cutout masks created for the target image part, and to draw the cut-out target image part on the one-page image.

These and other objects, features, aspects, and advantages of the present invention will become more apparent from the following detailed description of the preferred embodiments with the accompanying drawings.

DESCRIPTION OF THE PREFERRED EMBODIMENT

Figure 1:
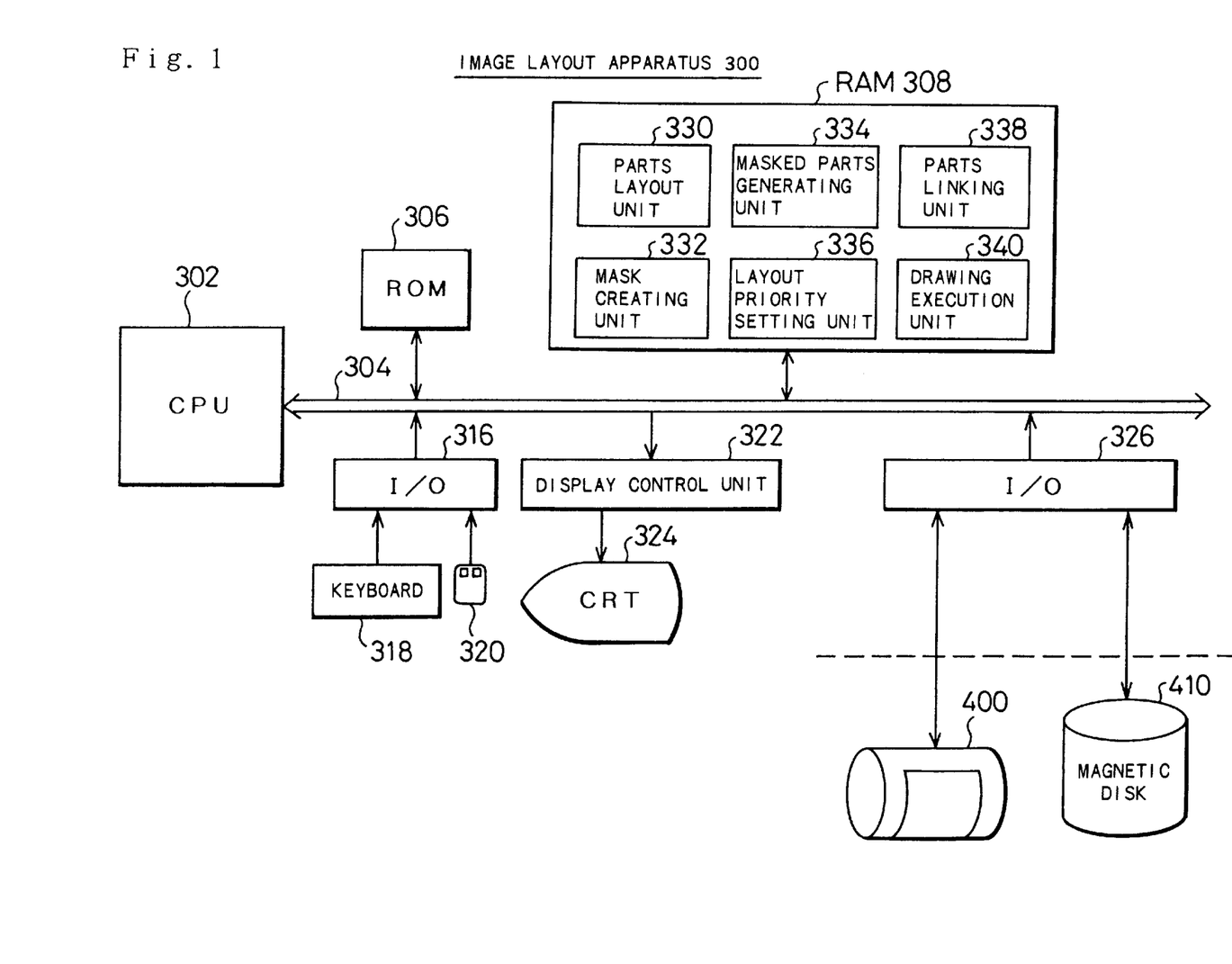
FIG. 1 is a block diagram illustrating the internal structure of an image layout apparatus embodying the present invention.

FIG. 1 is a block diagram illustrating the internal structure of an image layout apparatus embodying the present invention. The image layout apparatus 300 is realized as a computer system. A CPU 302, a ROM 306, a RAM 308, I/O interfaces 316 and 326, and a display control unit 322 are connected with one an other via a bus 304. A keyboard 318 and a mouse 320 working as a pointing device are connected to the first I/O interface 316. A color CRT 324 working as display device is connect ed t o the display control unit 322. A recording scanner 400 working as an image recording device and a magnetic disk 410 working as an external storage device are connected to the second I/O interface 326. Image parts data representing a plurality of image parts, which are to be laid out on a one-page image, and layout information of the image parts are stored in the magnetic disk 410. In the description of the embodiment, the term "image parts" implies both linework image parts and picture image parts.

The CPU 302 executes computer program codes stored in the RAM 308 to implement the functions of a parts layout unit 330, a mask creating unit 332, a masked parts generating unit 334, a layout priority setting unit 336, a parts linking unit 338, and a drawing execution unit 340. The parts layout unit 330 lays out an image part of interest or a target image part on a one-page image based on an instruction given by the user. The mask creating unit 332 creates one or a plurality of cutout masks with respect to the target image part which is to be laid out on the one-page image . The masked parts generating unit 334 generates a masked image part by combining the target image part with the cutout mask. The layout priority setting unit 336 allocates different layout priorities to a plurality of masked image parts. The parts linking unit 338 links the plurality of masked image parts, which are generated from the identical target image part, with one another and determines whether or not the plurality of masked image parts are to be laid out at an identical location on the one-page image. The drawing execution unit 340 draws the one-page image with the image parts laid out thereon and outputs the resulting one-page image to the display control unit 322 and to the record scanner 400.

The computer program codes (or applications programs) for implementing the functions of the respective units are stored in the magnetic disk 410 and transmitted to the RAM 308 when being executed. The computer program codes stored in the magnetic disk 410 is previously transmitted from a portable storage medium (carriable storage medium), such as an MOD or a CD-ROM. The program-transmitting process is required only once. The computer program codes may alternatively be supplied from a program supply system to the image layout apparatus via a communication line.

Figure 2:
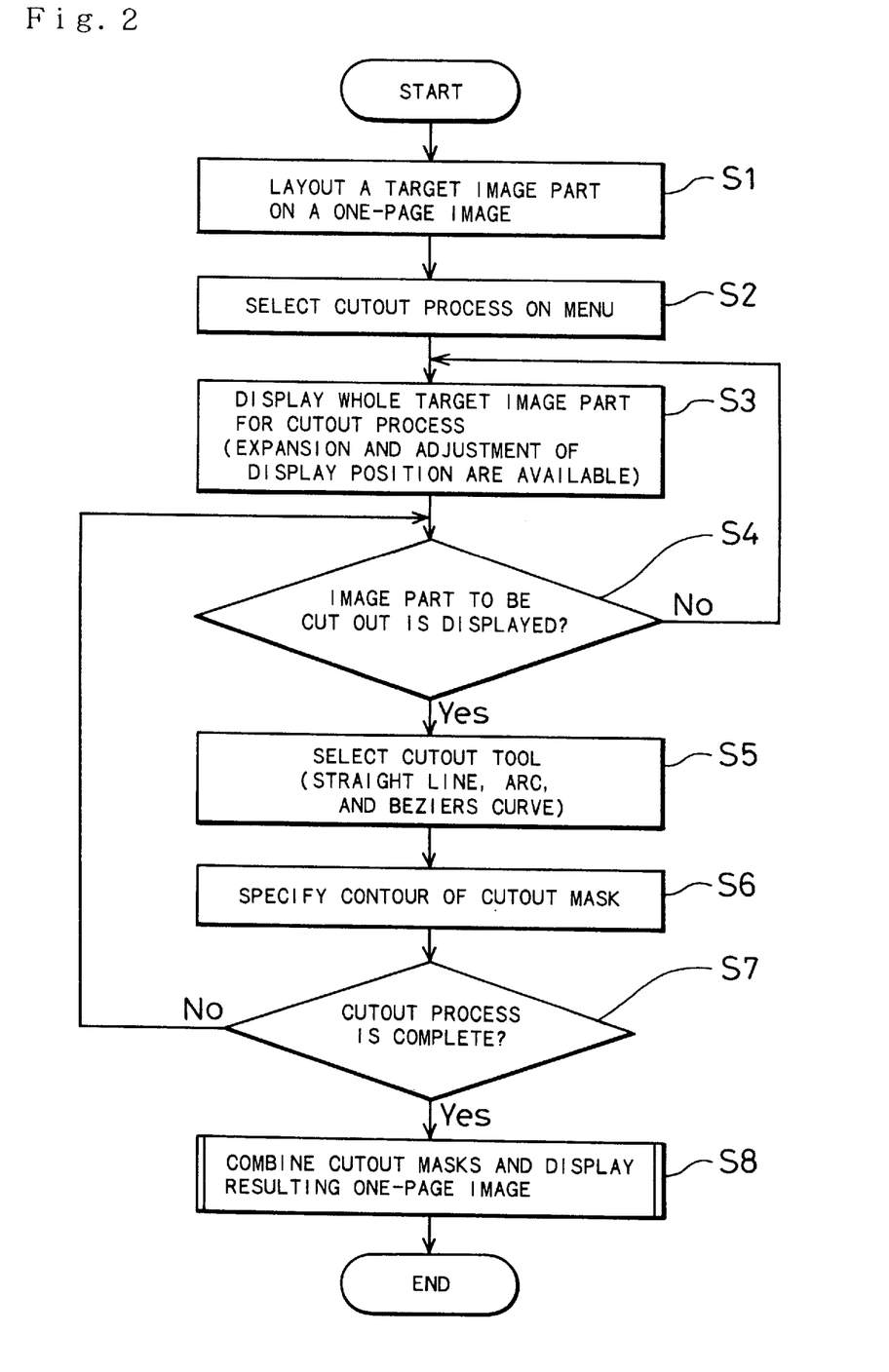
FIG. 2 is a flowchart showing a processing routine executed in the embodiment.
Figure 3A:
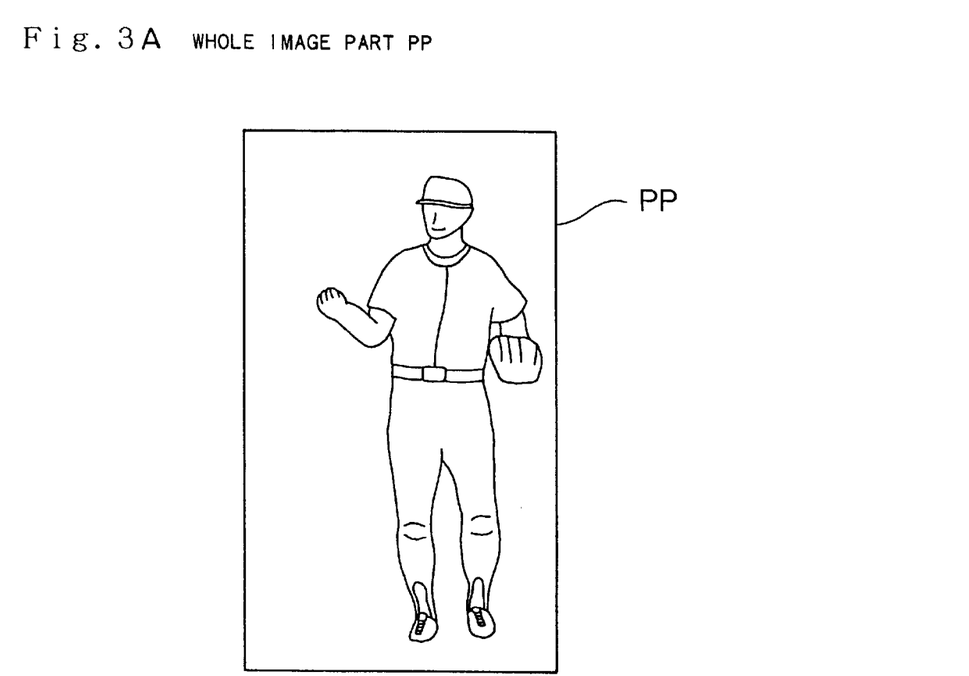
FIGS. 3A and 3B show an exemplified procedure of laying out one image part.
Figure 3B:
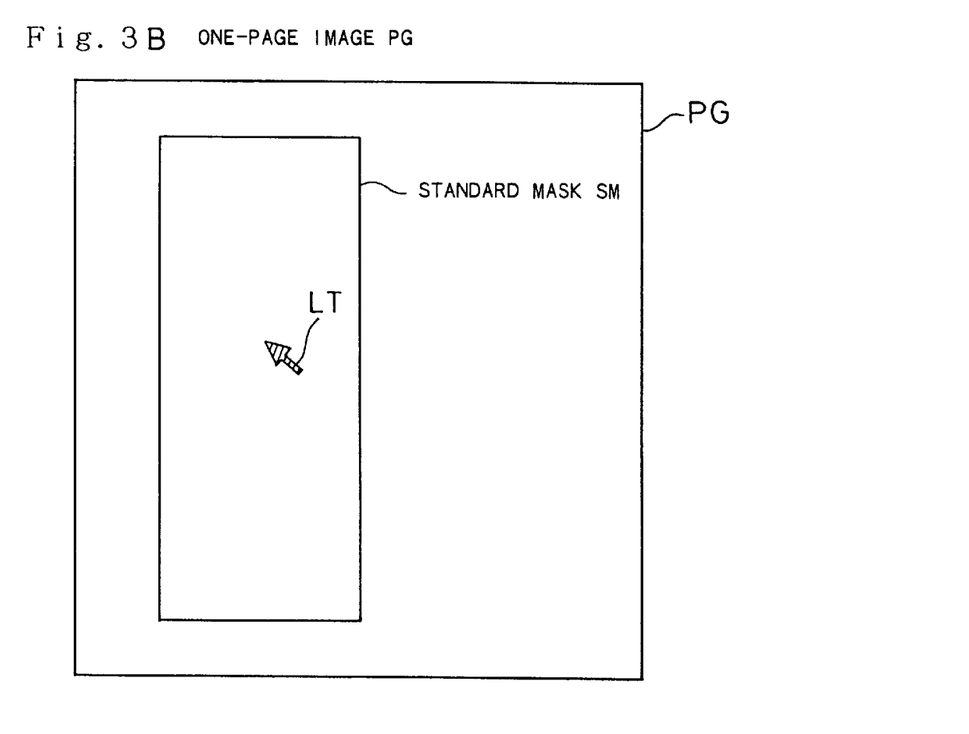

FIG. 2 is a flowchart showing a processing routine executed in the embodiment. When the program enters the routine, the parts layout unit 330 lays out an image part of interest or a target image part on a one-page image at step S1. FIGS. 3A and 3B show an exemplified procedure of laying out one image part. FIGS. 3A and 3B respectively illustrate an image part PP and a one-page image PG. The user first lays out a standard mask SM in a desired area of the one-page image PG as shown in FIG. 3B. The standard mask SM is a cutout mask having a predetermined area, and is used for stripping a picture image part in a standard area in the process of generating a one-page image of newspapers or magazines. The image layout apparatus can create various shapes of standard masks SM, such as rectangles (polygons), circles, and ellipses. The user can adjust the position of the standard mask SM with a positioning tool LT related to the movement of the mouse 320.

Figure 4:
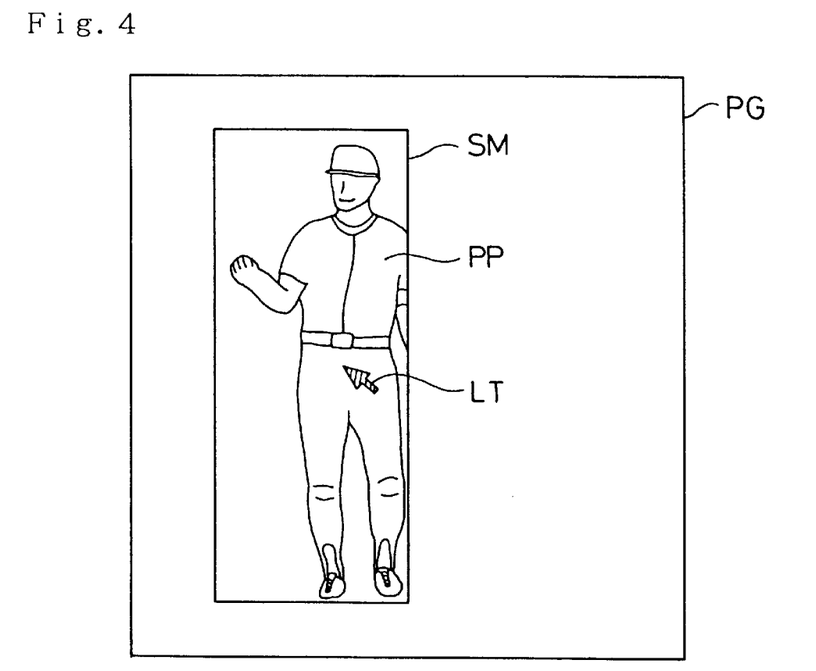
FIG. 4 shows an image part PP stripped in a standard mask SM.

The user then selects one of a plurality of image parts stored in the magnetic disk 410 after laying out the standard mask SM. The selected image part PP is accordingly stripped within the standard mask SM as shown in FIG. 4. Namely only an area of the image part PP corresponding to the standard mask SM is drawn on the one-page image PG. The user can adjust the position of the image part PP with the positioning tool LT or the keyboard 318. Only the position of the image part PP may be changed while the position of the standard mask SM is fixed. Alternatively, both the standard mask SM and the image part PP may be moved simultaneously while the relative positional relationship thereof is kept unchanged.

Figure 5:
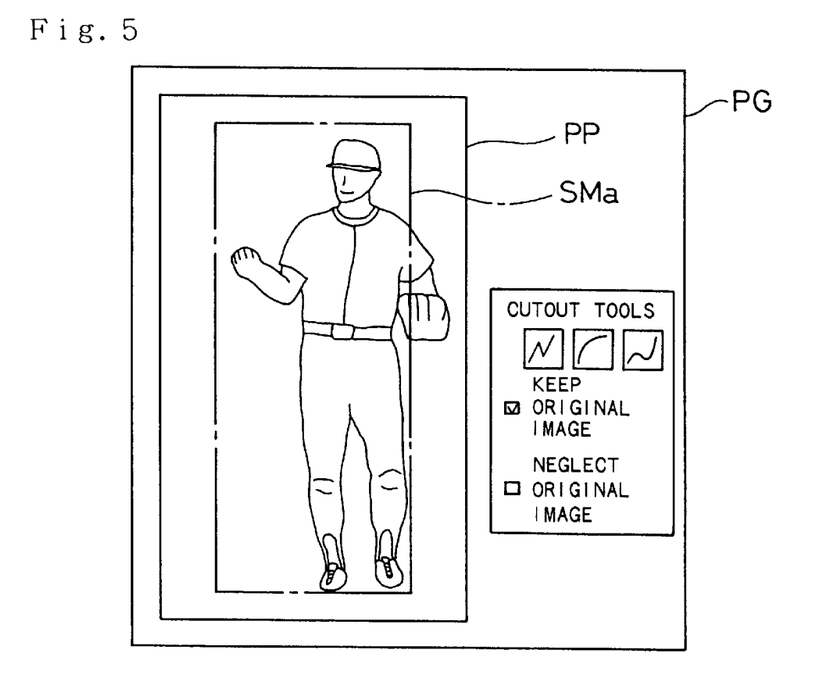
FIG. 5 shows a display of the whole image part PP laid out on a one-page image for a cutout operation.

The processing of steps S2 through S7 in the flowchart of FIG. 2 is executed by the mask creating unit 332 to create an additional cutout mask. The user first specifies the image part PP as an image part of interest (or target image part) and selects a cutout process on a menu at step S2. The whole target image part for the cutout process is then displayed at step S3. FIG. 5 shows a display on the screen at step S3. The area of the one-page image PG, the whole target image part PP, and a mask contour SMa representing the contour of the standard mask SM are displayed on the screen. Even when other image parts are laid out in the vicinity of the target image part PP, the target image part PP is preferentially displayed over the other image parts. A plurality of cutout tools, which are to be described later, applicable to specify the contour of a cutout mask are also displayed on the screen.

The user may specify a position within the image portion for which an additional cut mask is required, with the positioning tool LT to expand the image portion in the vicinity of the specified position at step S3. This will enable the contour of a cutout mask to be readily specified on the expanded image with a high degree of accuracy in the subsequent cutout process.

When the user notifies that the image portion of interest, for which an additional cut mask is required, is not displayed at step S4, the program returns to S3, at which the user gives an instruction to execute expansion of the image portion of interest or adjustment of its position on the display.

At step S5, the user selects a cutout tool among the displayed alternatives usable for specifying the contour of a cutout mask. In this embodiment, the available cutout tools include Straight Line, Arc, and Beziers Curve as illustrated in FIG. 5. The cutout tools represent a variety of connection curves used for connecting a plurality of points, which are specified by the user with the mouse 320, with one another. For example, when the user selects Straight Line, a plurality of specified points are successively linked with one another by line segments to define the contour of a cutout mask.

At step S5, the user can also select either one of the alternative modes for the cutout process, that is, Keep Original Image mode and Neglect Original Image mode as shown in FIG. 5. The first alternative, Keep Original Image mode keeps the original masked image part (or the image part cut out with a mask) and additionally creates a new masked image part. In this method, an additional cutout mask may be combined with the original cutout mask as described later. The second alternative, Neglect Original Image mode, on the contrary, neglects (that is, eliminates) the original cutout mask and leaves only a newly created cutout mask. In the Neglect Original Image mode, the whole image part PP may be specified as the image part of interest to carry out the cutout process for the whole area of the target image part PP. Here it is assumed that the first alternative, Leave original Image mode has been selected.

Figure 6:
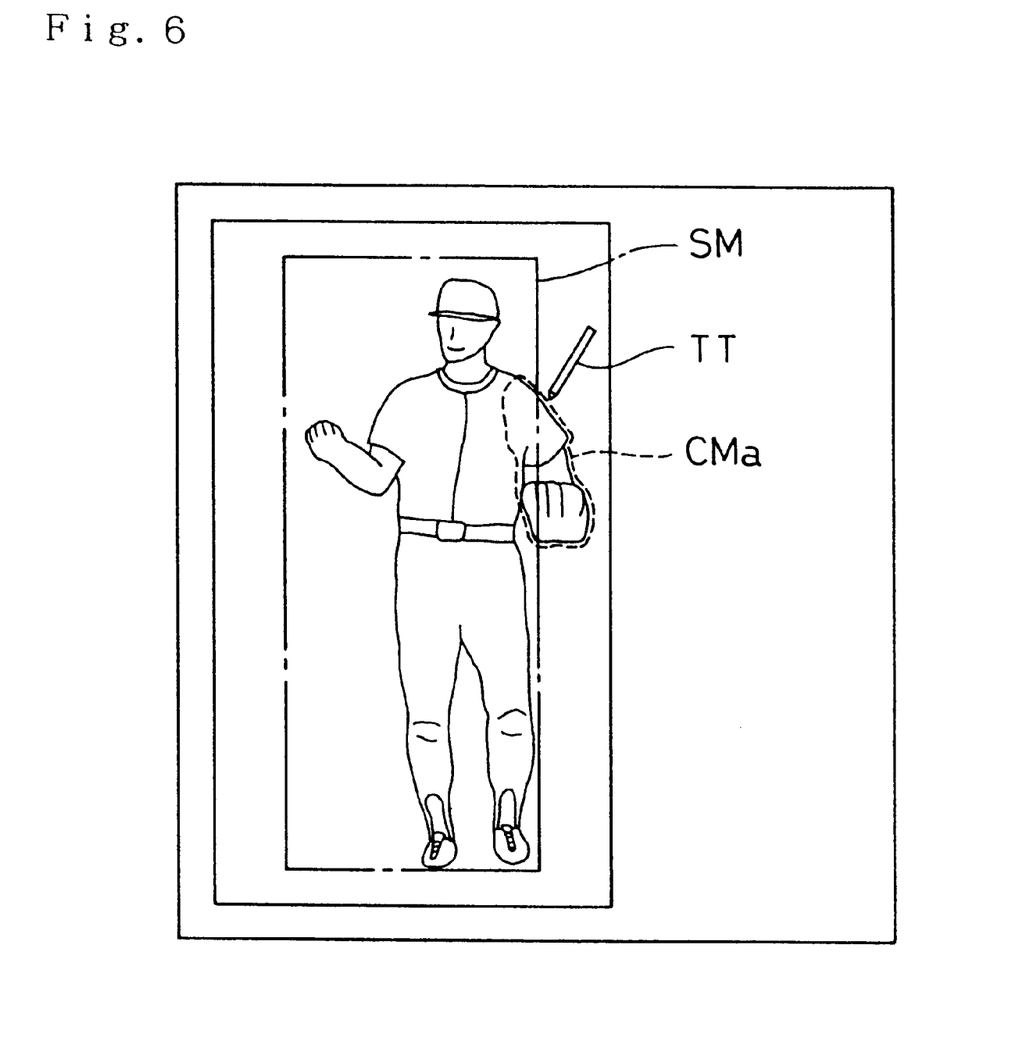
FIG. 6 shows a cutout operation executed at step S6.

At step S6 in the flowchart of FIG. 2, the user specifies with the mouse 320 the contour of an additional cutout mask with respect to the target image part PP displayed on the color CRT 324. FIG. 6 shows a cutout operation executed at step S6. The user specifies a plurality of points, which will constitute a contour CMa of an additional cutout mask, with a point specifying tool TT related to the movement of the mouse 320. The mask creating unit 332 then connects the plurality of specified points with one another using the specified cutout tool, so as to create the contour CMa of the additional cutout mask. When a plurality of additional cutout masks are required, the program returns from step S7 to S4 and repeats the processing of steps S4 through S6 discussed above.

Figure 7:
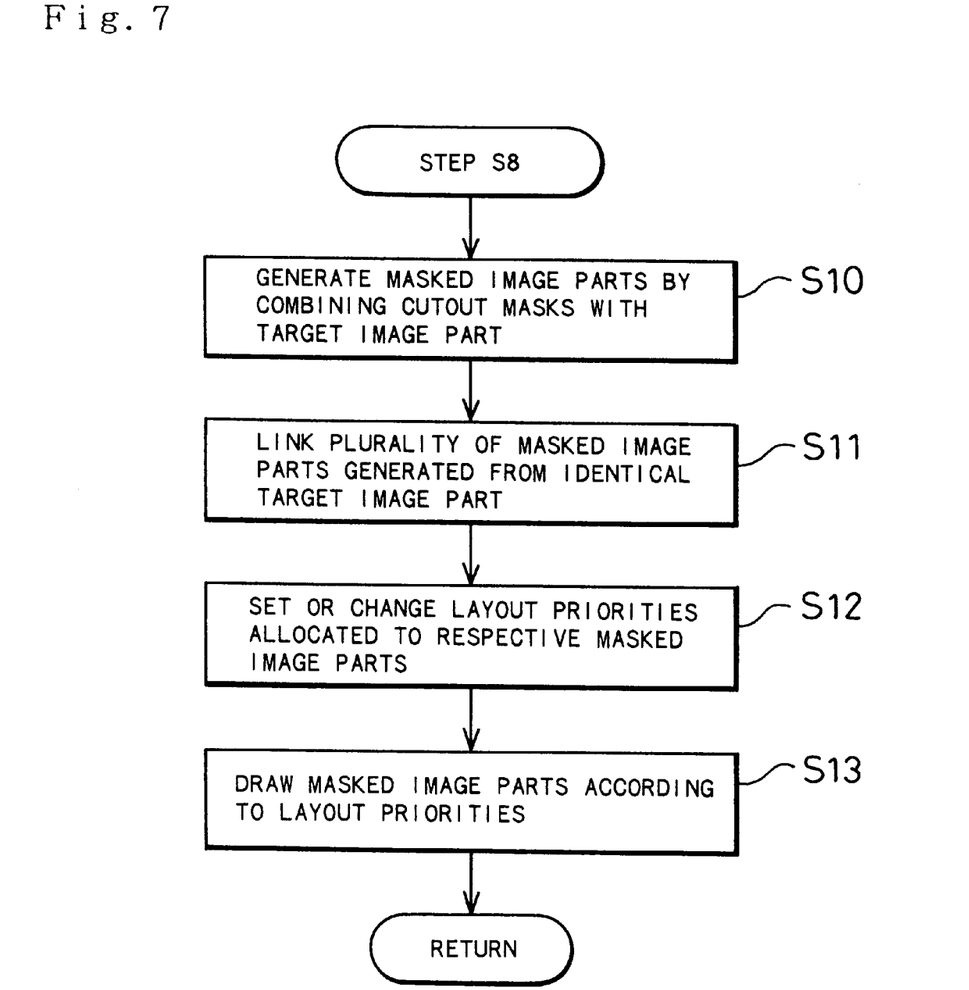
FIG. 7 is a flowchart showing details of step S8.

When it is determined that the cutout process has been completed at step S7, the program proceeds to step S8 in the flowchart of FIG. 2, at which the cutout masks are combined with each other and the resulting one-page image is displayed. FIG. 7 is a flowchart showing details of step S8.

Figure 8A:
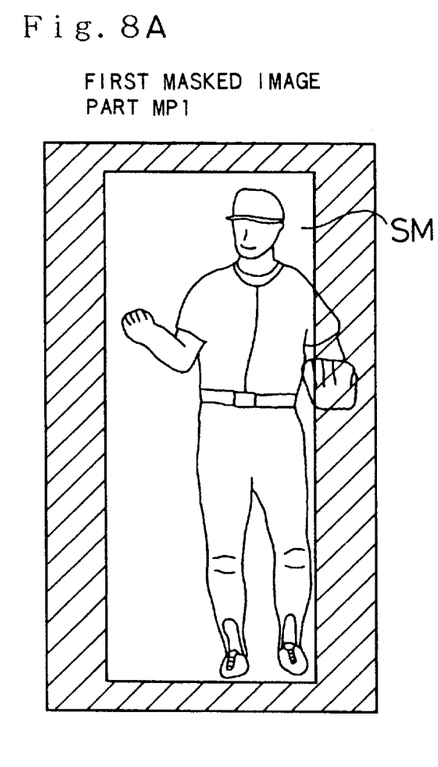
FIGS. 8A and 8B show two masked image parts MP1 and MP2 generated from the identical target image part PP.
Figure 8B:
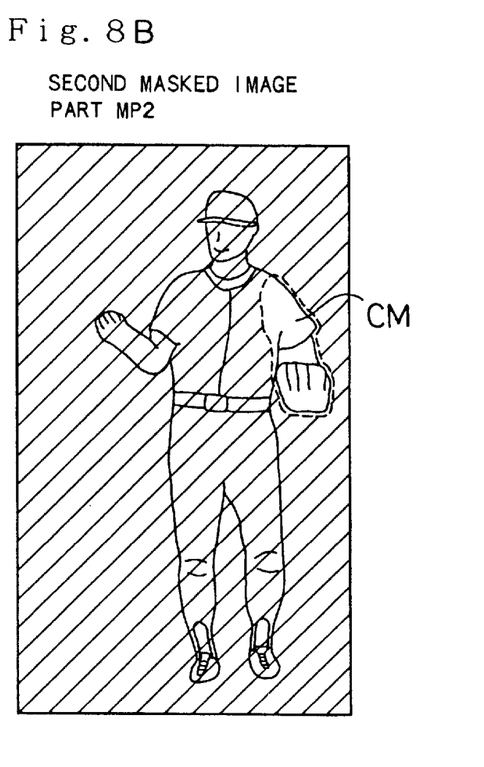
Figure 8C:
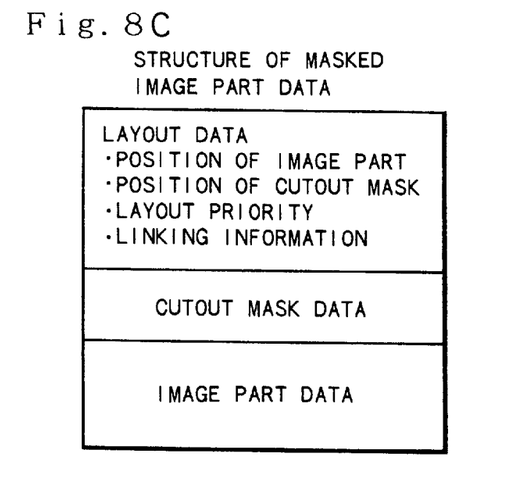
FIG. 8C schematically illustrates the structure of masked image part data.

At step S10 in the flowchart of FIG. 7, the masked parts creating unit 334 creates a plurality of masked parts by combining the cutout masks and the target image part. FIGS. 8A and 8B show two masked image parts MP1 and MP2 generated from the same target image part PP. The first masked image part MP1 shown in FIG. 8A is an image obtained by cutting out the target image part PP, that is a photograph of a baseball player, by the standard mask SM. The second masked image part MP2 shown in FIG. 8B is an image obtained by cutting out a baseball glove and a left arm included in the same target image part PP with an additional cutout mask CM generated by the operation shown in FIG. 6. As shown in FIG. 8C, data representing each masked image part include layout data, cutout mask data, and image part data. The layout data includes: positional data representing the positions of the target image part and the cutout masks within a one-page image; data representing layout priorities of the masked image parts; and linking information representing the linkage of the masked image part data with data of other masked image part. The layout priority represents an order of drawing a plurality of image parts on a one-page image. In an area where image parts overlap each other, the image part of the higher priority is drawn preferentially over other image parts of lower priority. In this embodiment, the lowest priority is allocated to the masked image part MP1 (FIG. 8A) including the standard mask SM, whereas the higher priority is automatically allocated to the masked image part MP2 (FIG. 8B) including the additional cutout mask CM.

The image part data represents an image part of interest. When the cutout process of Keep Original Image mode is selected by the operation of FIG. 5 discussed above, the image part data used in the second masked image part MP2 includes the whole of the original target image part PP (FIG. 3A). Alternatively, a file name of image part data may be registered in the masked image part data, and the image part data itself may be stored separately from the masked image part data.

When the cutout process of Neglect Original Image mode is selected by the operation of FIG. 5, the original standard masked image part MP1 is neglected, and only one masked image part is obtained with respect to the target image part PP. Namely the first masked image part MP1 is eliminated, and only the second masked image part MP2 remains.

The linking information include information indicating whether or not the plurality of masked image parts MP1 and MP2, which are generated from the same target image part PP, are related to each other (that is, whether they are linked with each other) in the layout in a one-page image, as well as information representing a file name of the other masked image part to be linked with the masked image part of interest. When a requirement of linking operation is set, the layout of the plurality of masked image parts linked with one another is adjusted so that the corresponding identical image areas are located at the same position. When the user changes the position of one of the plurality of masked image parts linked with one another, the position of the other masked image parts is changed automatically. The user can arbitrarily set the requirement or non-requirement of linking operation. However the Linking operation is initially set for the plurality of masked image parts which are generated from the same target image part.

Referring back to the flowchart of FIG. 7, at step S11, the parts linking unit 338 adjusts the linking state of the plurality of masked image parts that are generated from the same target image part. When the linking operation is not required, the setting is changed to "No Linking required". The processing of step S11 may set the linking state of a plurality of masked image parts generated from different image parts or set the linking state of a masked image part of interest with another image part without any cutout mask.

The processing of steps S10 and S11 may be executed after step S6 and before step S7 in the flowchart of FIG. 2 if necessary.

Figure 9:
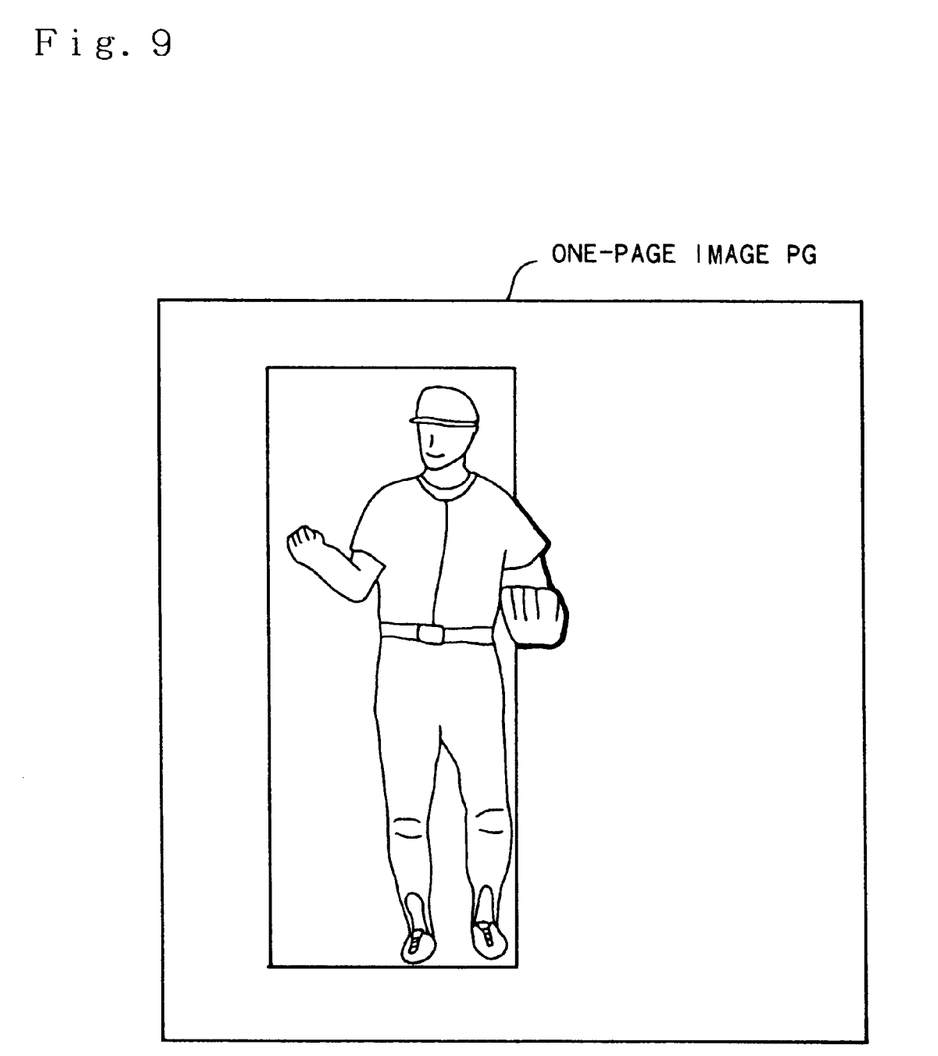
FIG. 9 shows a resulting one-page image obtained by drawing the two masked image parts MP1 and MP2.

The program subsequently proceeds to step S12, at which the layout priority setting unit 336 sets or changes the layout priority allocated to each masked image part. At step S13, the drawing execution unit 340 draws the respective masked image parts according to the preset layout priority to reproduce a one-page image. FIG. 9 shows a resulting one-page image obtained by drawing the two masked image parts MP1 and MP2 shown in FIGS. 8A and 8B. As clearly seen in FIG. 9, the resulting image generated by drawing the two masked image parts MP1 and MP2, which are generated from the same target image part PP, according to the preset layout priority is an image obtained by cutting out the image area which corresponds to the total area of the two cutout masks SM and CM (FIGS. 8A and 8B). The result of this drawing process is equivalent to the result obtained by combining the two cutout masks SM and CM to generate a combined mask and cutting out the original target image part with the combined mask. It is accordingly thought that the drawing process practically includes the process of combining cutout masks with each other.

In accordance with another possible application, the processing of step S12 may be executed after step S13 to change the layout priority and update the drawing state of the respective masked image parts.

The one-page image of FIG. 9 thus obtained is displayed on the color CRT 324. The one-page image may be recorded with the recording scanner 400 or another image recording device such as a printer (not shown), according to a request from the user.

Figure 10A:
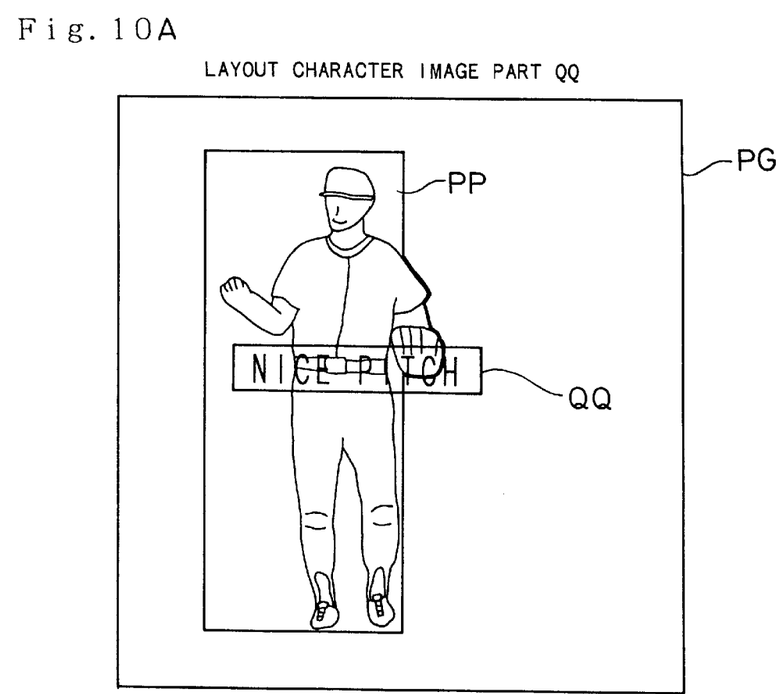
FIGS. 10A and 10B show a process of adding another image part to the one-page image.

FIGS. 10A and 10B show a process of adding another image part to the one-page image shown in FIG. 9. Referring to FIG. 10A, the user selects an image part QQ including a series of characters and lays out the image part QQ in the one-page image PG. In this case, the image part QQ lately stripped in has the highest layout priority, so that the one-page image displayed includes the whole image part QQ in a visually observable condition. In other words, the other image part PP previously laid out is partly hidden by the lately stripped image part QQ. The image part QQ including the series of characters is transparent other than the substantial parts of characters (that is, lines of characters), and the area of the image part PP corresponding to the transparent portion of the image part QQ other than the substantial parts of characters is not hidden.

Figure 10B:
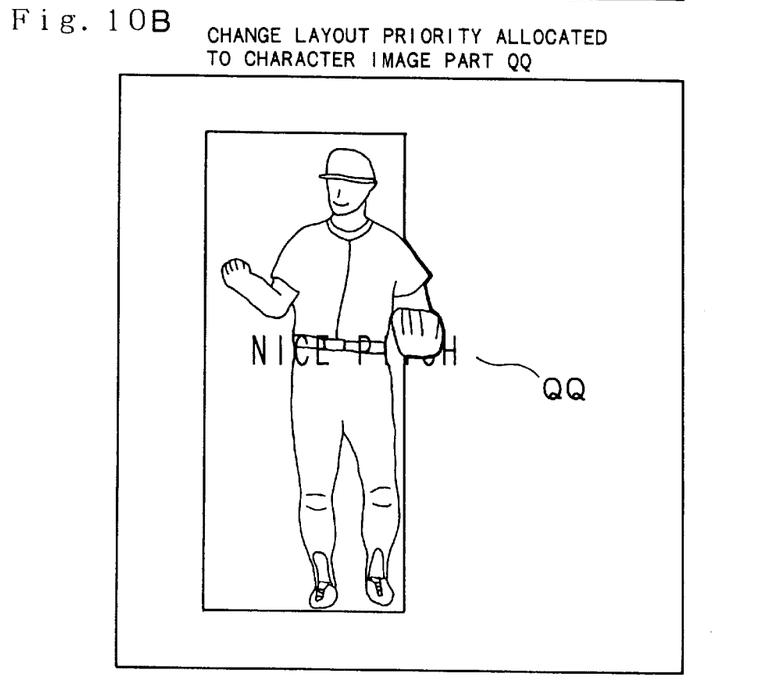
Figure 11A:
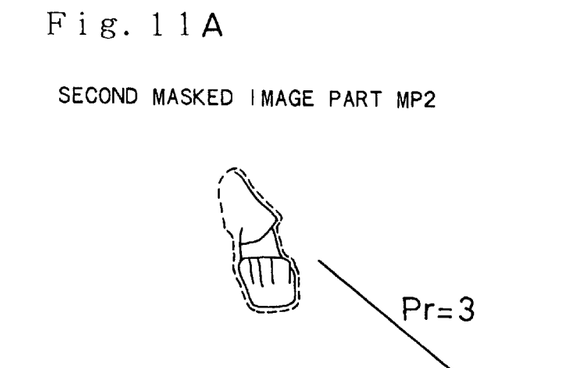
FIGS. 11A–11D show layout priorities allocated to three image parts and a result of drawing.
Figure 11B:
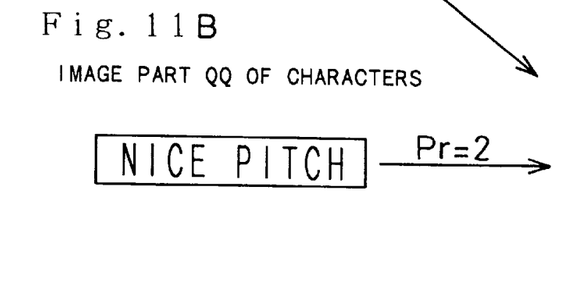
Figure 11C:
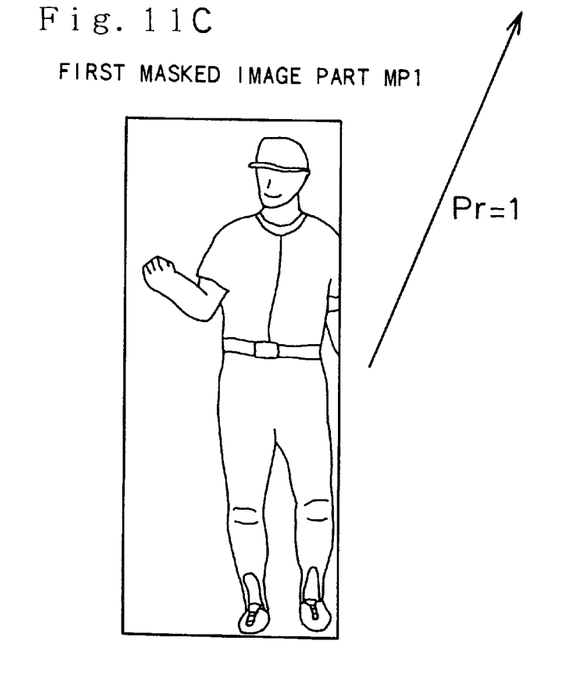

When the user sets the layout priority of the image part QQ including the series of characters to be intermediate between the layout priorities allocated to the two masked image parts MP1 and MP2 shown in FIGS. 8A and 8B, the resulting one-page image is changed to that shown in FIG. 10B. FIGS. 11A–11D show the layout priorities allocated to the three image parts and the result of drawing. A stripping level Pr=3 is allocated to the second masked image part Mp2 shown in FIG. 11A; a stripping level Pr=2 is allocated to the image part QQ of the characters shown in FIG. 11B; and a stripping level Pr=1 is allocated to the first masked image part MP1 shown in FIG. 1C. The greater value of the stripping level Pr represents the higher layout priority. For the clarity of illustration, FIGS. 11A and 11C show only the image parts cut out by the respective masks.

Figure 11D:
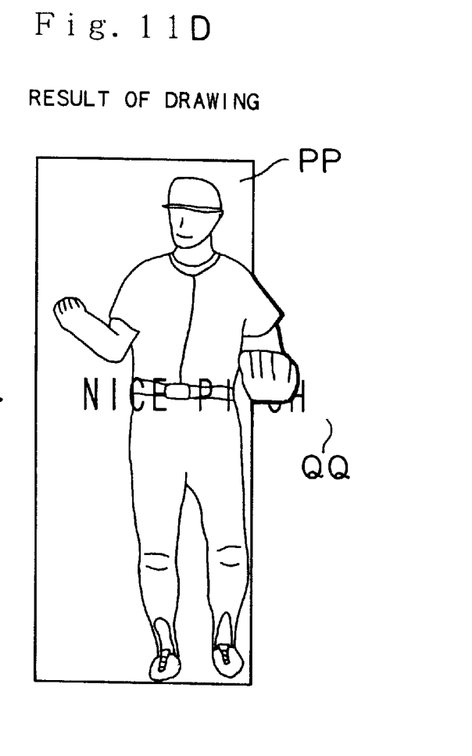

As clearly seen in FIG. 1D, the series of characters included in the image part QQ are drawn preferentially over the portion of a belt of the baseball player, whereas his baseball glove is preferentially drawn over the image part QQ. In the result of drawing thus obtained, one part (the portion of the belt) and another part (portion of the baseball glove) included in the same image part PP have different overlapping states against another image part QQ. Such visual effects are attained by independently allocating different layout priorities to the plurality of masked image parts MP1 and MP2 that are generated from the same target image part PP. Even when the user changes the positional relationship between the image parts PP and QQ from the state of FIG. 11D, the change of the layout does not affect the overlapping states of the image parts. Although another image part QQ includes a series of characters in the example of FIG. 11, a picture image part attains the similar visual effects.

As discussed above, the above embodiment enables the user to specify an image part laid out on a one-page image and create one or a plurality of cutout masks for the image part under the laid-out state. This facilitates to produce cutout masks suitable for the layout state. In the embodiment, a plurality of masked image parts generated from the same target image part are linked with one another. This enables to readily change the layout of the image part by adjusting the position of only one of the plural masked image parts, while keeping the positional relationship of the other masked image parts linked with the selected one. In the embodiment, different layout priorities are allocated independently to the plurality of masked image areas that are generated from the same target image part. As discussed above with the drawing of FIGS. 11A–11D, adjustment of the layout priorities will generate special visual effects to produce an image where the overlapping states of a plurality of image parts are different in some image areas.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for laying out an image part on a one-page image, said apparatus comprising:

display means for displaying said one-page image;

parts layout means for laying out a target image part on said one-page image, according to an instruction given by a user;

mask creating means for creating a plurality of cutout masks for said target image part which has been laid out on said one-page image, according to a specification given by the user, said plurality of cutout masks defining different areas of said target image part which overlap partly with each other; and drawing means for cutting out said different areas of said target image part using said plurality of cutout masks created for said target image part, and drawing the cut-out target image part on said one-page image.

2. An apparatus in accordance with claim 1, wherein said drawing means comprises:

masked parts generating means for generating a plurality of masked image parts by combining said target image part with said plurality of cutout masks; and layout priority setting means for allocating different layout priorities to said plurality of masked image parts, said layout priorities indicating an order of drawing said plurality of masked image parts.

3. An apparatus in accordance with claim 2, wherein said plurality of cutout masks created for said target image part includes a cutout mask created by said mask creating means and a standard cutout mask having a predetermined shape.

4. An apparatus in accordance with claim 2, wherein said drawing means further comprises:

parts linking means for linking said plurality of masked image parts with one another so that said plurality of masked image parts are positioned at interrelated locations on said one-page image.

5. An apparatus in accordance with claim 4, wherein said parts linking means comprises:

means for linking said plurality of masked image parts with one another so that the target image part included in each said plurality of masked image parts is positioned at the same location on said one-page image.

6. A method of laying out an image part on a one-image, comprising the steps of:

(a) laying out a target image part on said one-page image, according to an instruction given by a user;

(b) creating a plurality of cutout masks for said target image part which has been laid out on said one-page image, according to a specification given the user, said plurality of cutout masks defining different areas of said target image part which overlap partly with each other;

(c) cutting out said different areas of said target image part using said plurality of cutout masks created for said target image part;

(d) drawing the cut-out target image part on said one-page image.

7. A method in accordance with claim 6, wherein said step (c) comprises the steps of:

(i) generating a plurality of masked image parts by combining said target image part with said plurality of cutout masks; and (ii) allocating different layout priorities to said plurality of masked image parts, said layout priorities indicating an order of drawing said plurality of masked image parts.

8. A method in accordance with claim 7, wherein said plurality of cutout masks created for said target image part includes a cutout mask created by said mask creating means and a standard cutout mask having a predetermined shape.

9. A method in accordance with claim 7, wherein said step (c) further comprises the step of:

(iii) linking said plurality of masked image parts with one another so that said plurality of masked image parts are positioned at interrelated locations on said one-page image.

10. A method in accordance with claim 9, wherein said step (iii) comprises the step of:

linking said plurality of masked image parts with one another so that the target image part included in each said plurality of masked image parts is positioned at the same location on said one-page image.

11. A computer readable medium having computer program code means embodied therein for laying out an image part on a one-image, said computer program code means comprising:

computer program code means for causing a computer to layout a target image part on said one-page image, according to instruction given by a user;

computer program code means for causing the computer to create a plurality of cutout masks for said target image part which has been laid out on said one-page image, according to a specification given by the user, said plurality of cutout masks defining different areas of said target image part which overlap partly with each other; ands computer program code means for causing the computer to cut-out said different areas of said target image part using said plurality of cutout masks created for said target image part, and to draw the cut-out target image part on said one-page image.

12. A method of laying out first and second objects on a one-page image, said method comprising the steps of:

i) producing first and second masks for said first object, said first and second masks defining mutually different areas of said first object;

ii) assigning first and second priorities to said first and second masks, respectively, said first priority being higher than said second priority;

iii) assigning a third priority to said second object, said third priority being higher than said second priority and lower than said first priority; and vi) sequentially drawing, on said one-page image, a first area of said first object defined by said first mask, a second area of said first object defined by said second mask, and said second object, in order of said priorities.

13. A method in accordance with claim 12, wherein said first and second areas defined by said first and second masks partly overlap with each other.

14. A method in accordance with claim 12, wherein said first and second areas of said first object are representing by first and second masked object, respectively, and said first and second masked objects are linked with each other so that said first and second masked objects are positioned at interrelated locations on said one-page image.

15. A method in accordance with claim 14, wherein said first and second masked objects are linked with each other so that a common part of said first and second masked objects is positioned at the same location on said one-page image.

* * * * *